United States Patent
Chawda et al.

(10) Patent No.: US 12,510,973 B2
(45) Date of Patent: Dec. 30, 2025

(54) MOTION MAPPING FOR CONTINUOUS GESTURES USING USER-CENTRIC COORDINATE SYSTEM

(71) Applicant: Apple Inc., Cupertino, CA (US)

(72) Inventors: Vinay Chawda, Santa Clara, CA (US); Chase B. Lortie, San Francisco, CA (US); Daniel J. Brewer, San Jose, CA (US); Julian K. Shutzberg, San Francisco, CA (US); Leah M. Gum, San Francisco, CA (US); Yirong Tang, San Francisco, CA (US); Alexander T. Wing, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/472,724

(22) Filed: Sep. 22, 2023

(65) Prior Publication Data
US 2024/0103634 A1 Mar. 28, 2024

Related U.S. Application Data

(60) Provisional application No. 63/376,932, filed on Sep. 23, 2022.

(51) Int. Cl.
*G06F 3/01* (2006.01)

(52) U.S. Cl.
CPC ................... *G06F 3/017* (2013.01)

(58) Field of Classification Search
CPC .......... G06F 3/011; G06F 3/014; G06F 3/017; G06F 3/0304; G06F 3/04815; G06F 3/0482; G06V 40/28; G06V 20/10; G06N 5/01
See application file for complete search history.

(56) References Cited

U.S. PATENT DOCUMENTS

| | | | |
|---|---|---|---|
| 9,619,105 B1* | 4/2017 | Dal Mutto | G06F 3/04815 |
| 2011/0080336 A1* | 4/2011 | Leyvand | G06F 3/017 382/103 |
| 2011/0080475 A1* | 4/2011 | Lee | G06F 3/017 382/103 |
| 2011/0296353 A1* | 12/2011 | Ahmed | G06F 3/017 715/848 |
| 2014/0085185 A1* | 3/2014 | Sarwar | G06F 3/017 345/156 |
| 2014/0184494 A1* | 7/2014 | Burachas | G06F 3/017 345/156 |
| 2014/0211991 A1* | 7/2014 | Stoppa | G06V 40/28 382/103 |
| 2014/0215407 A1* | 7/2014 | Ahmed | G06F 3/0304 715/850 |
| 2016/0148435 A1* | 5/2016 | Li | G06F 3/0482 715/848 |

(Continued)

*Primary Examiner* — Richard J Hong
(74) *Attorney, Agent, or Firm* — Blank Rome LLP

(57) ABSTRACT

A movement of a user input component is presented in accordance with a mapping of a user input motion from a user-centric spherical coordinate system to a 2D plane. An input motion by a user is detected. An origin for the input motion is identified in a user-centric spherical coordinate system. An arc length for the input motion is determined based on the identified origin. The input motion is mapped from the user-centric spherical coordinate system to a 2D plane of a user input component, and a movement of the user input component is presented on the 2D plane in accordance with the mapping.

19 Claims, 12 Drawing Sheets

(56) References Cited

U.S. PATENT DOCUMENTS

| | | | |
|---|---|---|---|
| 2020/0012350 A1* | 1/2020 | Tay | G06N 5/01 |
| 2021/0081052 A1* | 3/2021 | Singh | G06F 3/017 |
| 2021/0090332 A1* | 3/2021 | Ravasz | G06V 40/28 |
| 2021/0263593 A1* | 8/2021 | Lacey | G06V 20/10 |

* cited by examiner

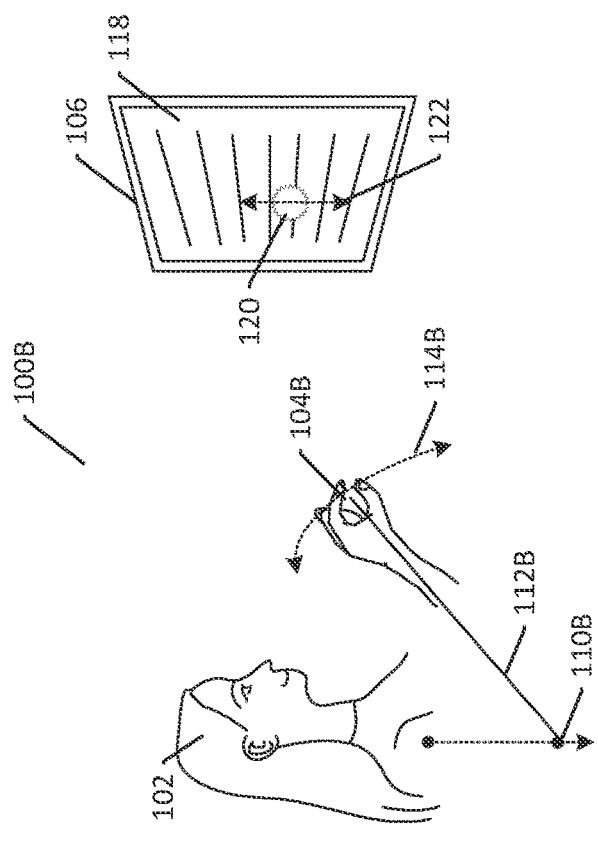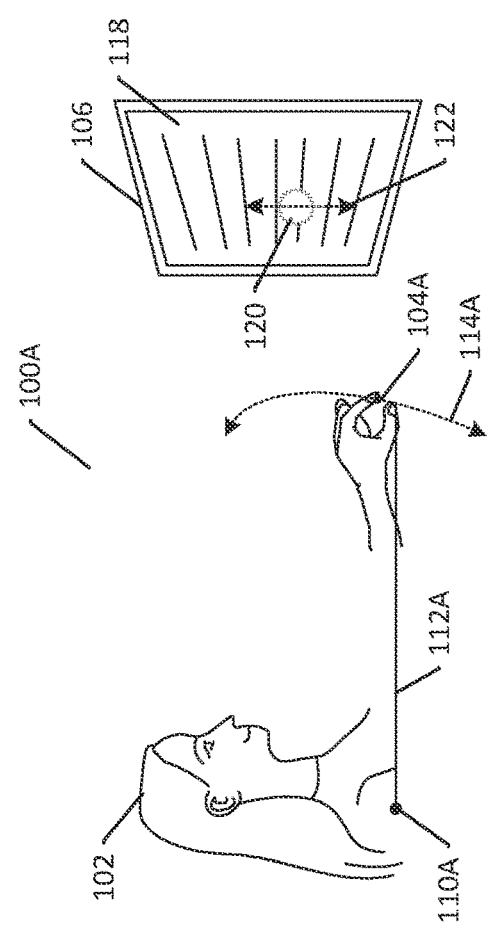

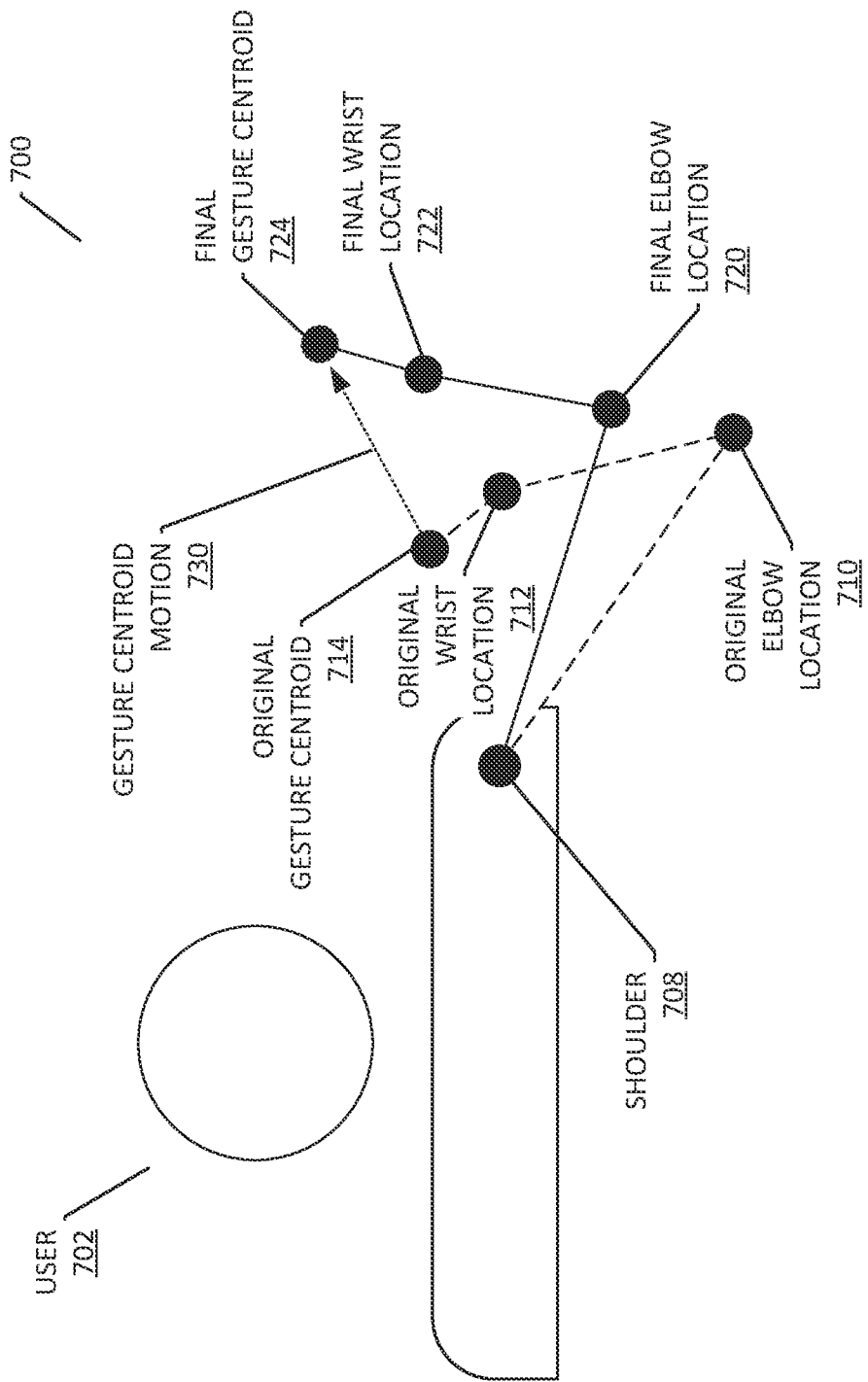

MOTION MAPPING FOR CONTINUOUS GESTURES USING USER-CENTRIC COORDINATE SYSTEM

BACKGROUND

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with realistic properties. Some XR environments allow multiple users to interact with virtual objects or with each other within the XR environment. For example, users may use gestures to interact with components of the XR environment.

BRIEF DESCRIPTION OF THE DRAWINGS

FIGS. 1A-1B show diagrams of a user interacting with a device, in accordance with some embodiments.

FIG. 7 shows a diagram for lost motion capture, in accordance with one or more embodiments.

DETAILED DESCRIPTION

Figure 2:
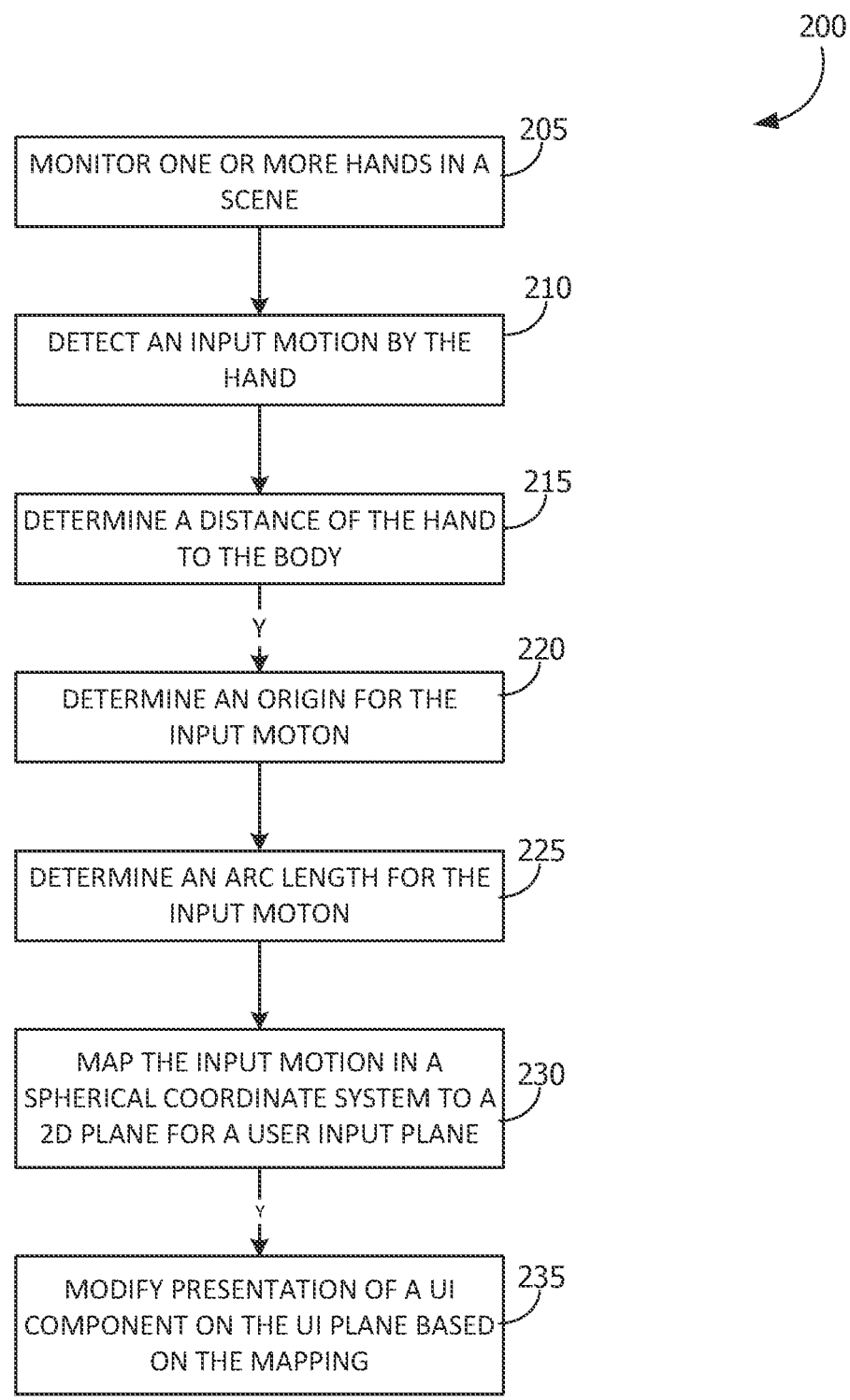
FIG. 2 shows a flowchart of a technique for mapping an input motion to a spherical coordinate system, in accordance with some embodiments.

This disclosure pertains to systems, methods, and computer readable media to provide user centric motion mapping. In particular, this disclosure describes techniques for mapping user motion associated with gesture input from a spherical coordinate system to into a planar, or 2D coordinate system. Further, techniques described herein relate to determining an appropriate origin for such spherical coordinate system in various contexts.

According to some embodiments, an input motion of a user may be detected. An origin for the input motion may be determined, for example with respect to an arc of the motion. The origin of the input motion may be determined in association with a location on the user. For example, the origin may be determined based on a location of a user joint, such as a shoulder, elbow, wrist, or the like. Further, in some embodiments, the origin may be located along a vector or originating from one of the joints, such as a gravity vector from one of the joints, a vector that connects to of the joints, or the like. The arc length may be determined, for example, based on a determined location of a hand or gesture centroid, such as a determined center of the pinch or the like. Then, the arc length may be translated to a 2D user input component, such as a user interface plane.

Embodiments described herein provide an improved technique for providing gesture-based input based on detected user behavior. Users tend to move using arc motions based on constraints of human anatomy. For example, humans moving their arms in space will move in an arc based on the constraint of the shoulder joint, elbow joint, wrist joint, or the like. When applying these arc motions as input to with to the user interface, artifacts may occur, such as accidental inputs, unintentional directional movement, jittering, or the like. Embodiments described herein address these issues by tracking hand motion-based input in a spherical coordinate system, and the translating the hand motion from the spherical coordinate system to a 2D coordinate system of a user interface plane. As such, techniques provide an improvement in mapping user motion to a user interface, thereby improving a device's ability to analyze user input, and providing improvements to the user interface itself.

Embodiments described herein additionally describe a technique for determining user-centric motion based on a user's movement of an arm/hand by decomposing the biomechanical chain of the arm movement about various joints of the arm. That is, a motion of a gesture centroid can be determined by determining an amount of motion of the gesture centroid is attributable to a rotation about a shoulder, an amount of motion of the gesture centroid that is attributable to rotation about an elbow, and an amount of motion of the gesture centroid that is attributable to rotation about a wrist. Each of these motion calculations can be determined in the form of a vector, which when added together, provides the full motion of the gesture centroid.

According to one or more embodiments, decomposing the biomechanical chain in such a way to determine user-input motion provides numerous technical improvements. For example, many hand tracking and body tracking systems provide joint locations in a more accurate or more frequent manner. These joint locations may include, for example, locations of a shoulder, elbow, wrist, and/or fingertip or other joint or joints from which a gesture centroid may be derived. Accordingly, by determining the directional and/or distances of a motion of a gesture centroid attributable to rotations about the various joints, the user input motion may more accurately reflect user intent than if the motion of the gesture centroid was tracked without contextual information arising from the motion of the various joints.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints) and that these goals may vary from one implementation to another. It will also be appreciated that such development efforts might be complex and time-consuming but would nevertheless be a routine undertaking for those of ordinary skill in the design and implementation of graphics modeling systems having the benefit of this disclosure.

FIGS. 1A-B show a system setup for a user interacting with a device, in accordance with some embodiments. It should be understood that the various features and description of FIGS. 1A-B are provided for illustrative purposes and are not necessarily intended to limit the scope of the disclosure.

In FIG. 1A, a system setup 100A is provided in which a user 102 is viewing a display device 106. In particular, FIG. 1A depicts an example of a user 102 using a gesture motion 114A by hand 104A to cause user input to modify a user input component 120 on a display device 106. As shown, the motion 114A caused by hand 104A is provided in an arc motion. In some embodiments, the motion is tracked in a spherical coordinate system. The spherical coordinate system provides an arc length of a motion 114A with respect to an origin 104A. As will be described below, the arc length of motion 114A can be determined based on a radius 112A which is determined from the origin 110A to a gesture centroid of the hand 104A. According to some embodiments, the gesture centroid 104A is a point in space on or near a hand, which is determined to be the center of an input gesture performed by a hand, and which is used for determining arc length of a gesture. As such, the gesture centroid can typically be located coincident with a point on or near the hand. As an example, in some embodiments, a pinch centroid may be a point in space at which contact occurs between two fingers performing the pinch. Alternatively, a gesture centroid may be determined as a point in space coincident with a central point of a hand, a central point based on a palm and/or finger location, or the like. The user motion in 3D space, as shown by motion 114A, is mapped to a 2D user interface ("UI") plane, for example user interface 118 of display 106. For example, a user input component 120 can move in a direction 122 across the 2D plane of the user interface 118 based on the mapping of the user motion 114A.

In some embodiments, it may be preferable to modify the origin from which the arc length is determined based on user pose. Turning to FIG. 1B, a system setup 100B is provided in which a user 102 is viewing a display device 106. In FIG. 1B, the user 102 is performing a gesture using hand 104B with the user's arm brought in closer to the user's body. According to some embodiments, a change in the distance from the hand 104B (or, in some embodiments, the gesture centroid) to the user's body causes the origin of the spherical coordinate system to be modified. For example, as a user brings in the hand toward the body (e.g., bends the elbow), the origin may shift to a different position, as shown at 110B. In some embodiments, the origin is shifted to a different joint, such as a location coincident with an elbow, rather than a location coincident with the shoulder, as shown at 110A. Alternatively, the origin may be shifted down a vector originating at the shoulder, such as a gravity vector originating at the shoulder, or a vector from the shoulder to elbow or other joint. As another example, the vector may originate at a location of the torso and be directed in a downward direction. Further, in some embodiments, the updated origin location may be determined based on a relative distance of the hand and/or gesture centroid from the user in a dynamic manner, for example proportionally to the distance of the hand and/or gesture centroid from the user's torso or shoulder location. In some variations, the updated origin maybe shifted behind the user (in addition to shifting down), also being proportional to the distance between gesture centroid and user's torso or shoulder location. Accordingly, the arc length of motion 114B can be determined based on a radius 112B which is determined from the updated origin 110B to a gesture centroid of the hand 104B. The user motion in 3D space, as shown by motion 114A, is mapped to a 2D user interface ("UI") plane, for example user interface 118 of display 106. As such, the user input component 120 can move in a direction 122 across the 2D plane of the user interface 118 based on the mapping of the user motion 114B, which may provide a different input than motion 114A due to the different origin and arc length.

FIG. 2 depicts a flowchart 200 of a technique for mapping the user input motion from a spherical coordinate system to a 2D UI plane to provide user input. Although the various processes, it should be understood that the various actions may be performed by alternate components. In addition, the various actions may be performed in a different order. Further, some actions may be performed simultaneously, and some may not be required, or others may be added.

The flowchart 200 begins at block 205, where one or more hands are monitored in a scene. The hands can be monitored, for example, by a hand tracking system of the user device. In particular, image data and/or other sensor data may be captured of a user's hand or hands moving in space in order to determine location, motion, gestures, and the like. The one or more hands may be monitored by sensors on a wearable device worn by the user, or another device from which center data may be captured of the user's hand or hands.

The flowchart continues at block 210, where an input motion is detected by the hand or hands. For purposes of clarity, the flowchart will describe a detected input motion by a single hand, although it should be understood that in some embodiments input motion may be detected by either of the user's hands. In some embodiments, the input motion may be detected, for example, based on a predetermined gesture, pose, or other behavior by the user which is associated with triggering user input. Examples of input motions may include, for example, a pinch, a pluck, a swipe, or the like. In some embodiments, the detection of the input motion may trigger additional operations of the device in order to perform the mapping. For example, when the input motion is detected, cameras or other sensors may be powered on or otherwise initiated in order to determine user pose or other parameters or assessing the input motion.

The flowchart continues at block 215, where a distance is determined between the hand and a reference point on the body. The reference point on the body may be determined, for example, based on a location of a user's shoulder, torso, head position, neck position, or the like. In some embodiments, the system may track a current location in space coincident with the reference point, or may consider a user centric coordinate system from which other locations in space may be determined surrounding the user. With respect to the shoulder of a user may determine, for example based on camera and/or other sensor data, a current location of the shoulder. Alternatively, the system may determine the shoulder location as an offset from a known point, such as a head position. The distance of the hand may be determined, for example, based on a point in space of the hand with respect to a system coordinate system or the like. In some embodiments, a location of the body from which the distance of the hand is determined may be based on a head pose. For example, a torso and/or shoulder estimate may be a fixed offset from a determined head location. The fixed offset may be a default offset, or may be specific to a user. For example, the fixed offset may be determined based on enrollment information for the user of the system.

At block 220, the flowchart 200 includes determining an origin for the input motion. In some embodiments, the origin is determined to be at a location coincident with the user's shoulder. The user's shoulder location may be determined using techniques described above. Further, in some embodiments, the shoulder position may be determined based on a fixed offset from an estimated chest pose. For example, a chest pose may indicate an orientation of a user's torso by identifying a direction towards which the chest is facing. The chest pose may be determined, for example, based on body facing cameras or other sensor information that captures the chest of the user.

As will be described below, in some embodiments the origin may be located at a different location than the shoulder. For example, the origin is located at a point coincident with other joints in some embodiments. That is, the origin can be located at a point coincident with a user's elbow, a point coincident with a user's wrist, or the like. Further, in some embodiments, the origin may be determined at a point in space based on a pose of the user, but not necessarily coincident with user's body. As an example, in some embodiments, the origin may be located along a vector originating from one of the joints. The vector may include, for example, a gravity vector, a vector that travels along two joint locations, or the like.

The flowchart 200 continues at block 225, wherein arc length is determined for the input motion. According to some embodiments, the arc length is determined according to a spherical coordinate system where 3D points are defined by radius, pitch, and yaw about an origin which is identified as described above with respect to block 220. According to one or more embodiments, the spherical coordinate system may originate around a point associate with the user, and thus may be a user-centric spherical coordinate system. The arc length may indicate a distance and direction of a gesture that a hand performs during the input motion. At block 230, the input motion is mapped from the spherical coordinate system to a 2D plane associated with the UI. According to some embodiments, the arc length is measured along yaw and pitch, and is mapped to X and Y coordinates. The arc length is also mapped to Z coordinates with respect to radial motion. The coordinates in the spherical coordinate system are projected onto the plane of the UI. In some embodiments, a spherical projection is performed, where the position is proportional to the angle. That is, an amount of distance covered on the user interface plane is based on an angular distance the hand travels during the motion. Alternatively, in some embodiments, the distance covered on the plane will be based on an actual distant the user's hand moves along the arc.

As will be described below, additional considerations may be used to determine motion mapping. For example, in some embodiments, gain may be reduced as a hand moves away from the body. That is, a hand movement further away from the user's body may result in less distance covered on the plane. As another example, gain may be determined based on a comparison of the distance of the hand from the body (i.e., the torso location and for the shoulder location). In some embodiments, the particular function used to perform the mapping may be driven by user preference (such as in the user profile), application settings, system settings, and the like. Further, different mapping techniques may be performed based on particular contexts, applications, and the like.

The flowchart 200 concludes at block 235, where a presentation of the UI component is modified on the UI plane based on the mapping. For example, a cursor or other input component may be caused to move along the UI plane in accordance with the mapping. Because the mapping considers distance as well as direction, a corresponding distance and direction will be apparent based on the change presentation of the UI component. UI component may include, for example, a cursor, a scrollbar, or other movement-based input component.

Figure 3:
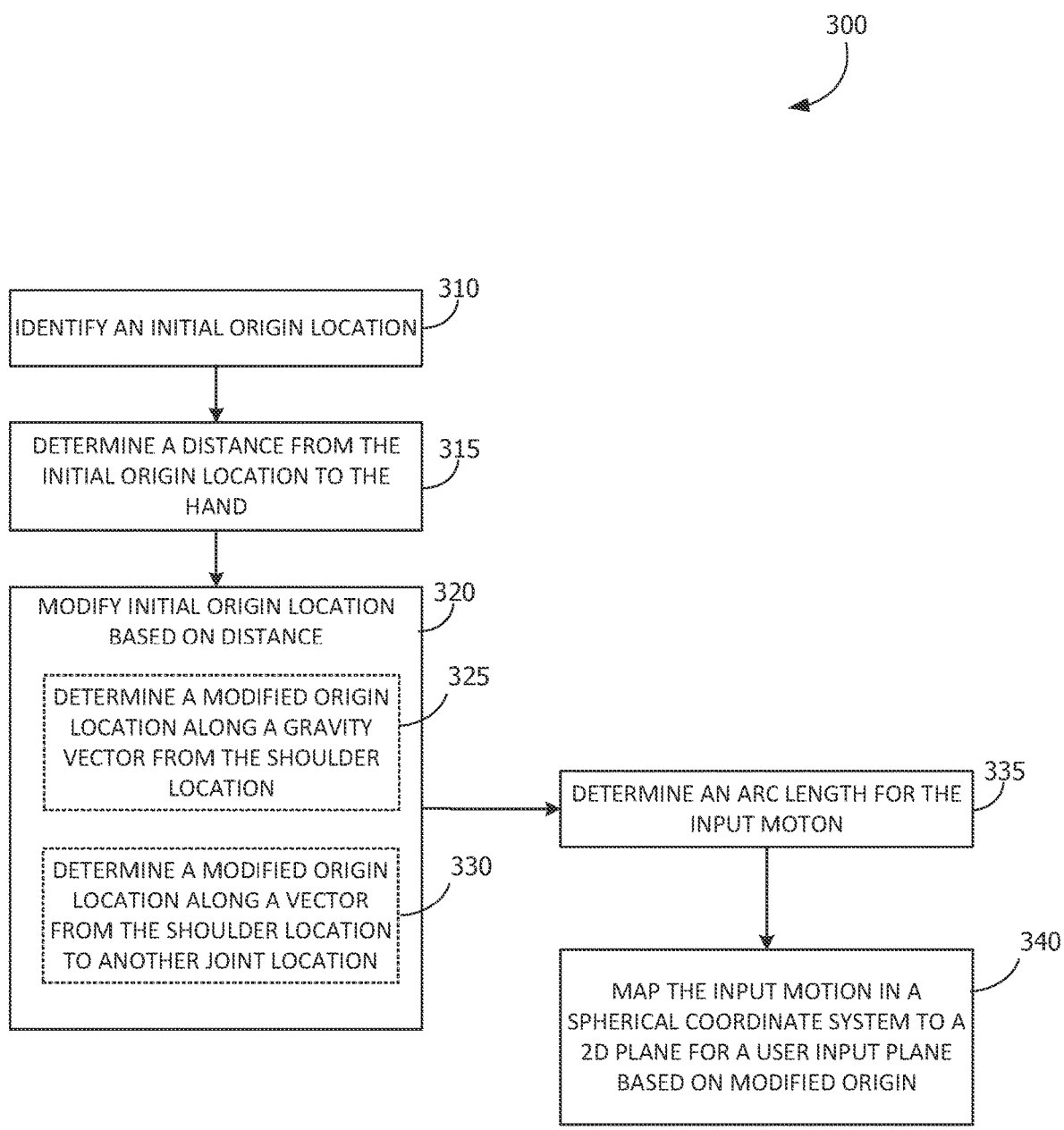
FIG. 3 shows a flowchart of a technique for determining an origin for a spherical coordinate system, in accordance with some embodiments.

FIG. 3 depicts a flowchart of a technique for modifying an origin, and according to one or more embodiments. Although the various processes, it should be understood that the various actions may be performed by alternate components. In addition, the various actions may be performed in a different order. Further, some actions may be performed simultaneously, and some may not be required, or others may be added.

The flowchart 300 begins at block 310, an initial origin location is identified based on the shoulder location. In some embodiments, the initial origin location may be a location determined to be coincident with the shoulder location. Alternatively, the initial origin location may be determined as an offset from a location on a user, such as an offset from a head position (which, in some embodiments, may be used as a determination of a shoulder location) Alternatively, in some embodiments, the origin may be based on an offset from a determined joint location, such as along a vector originating at the shoulder location, intersecting the elbow or wrist, or the like. That is, according to one or more embodiments, hand and/or body tracking may be used to determine and track different joints of an arm and/or hand. The initial origin location may be determined based on one of the joints determined from tracking.

Figure 4:
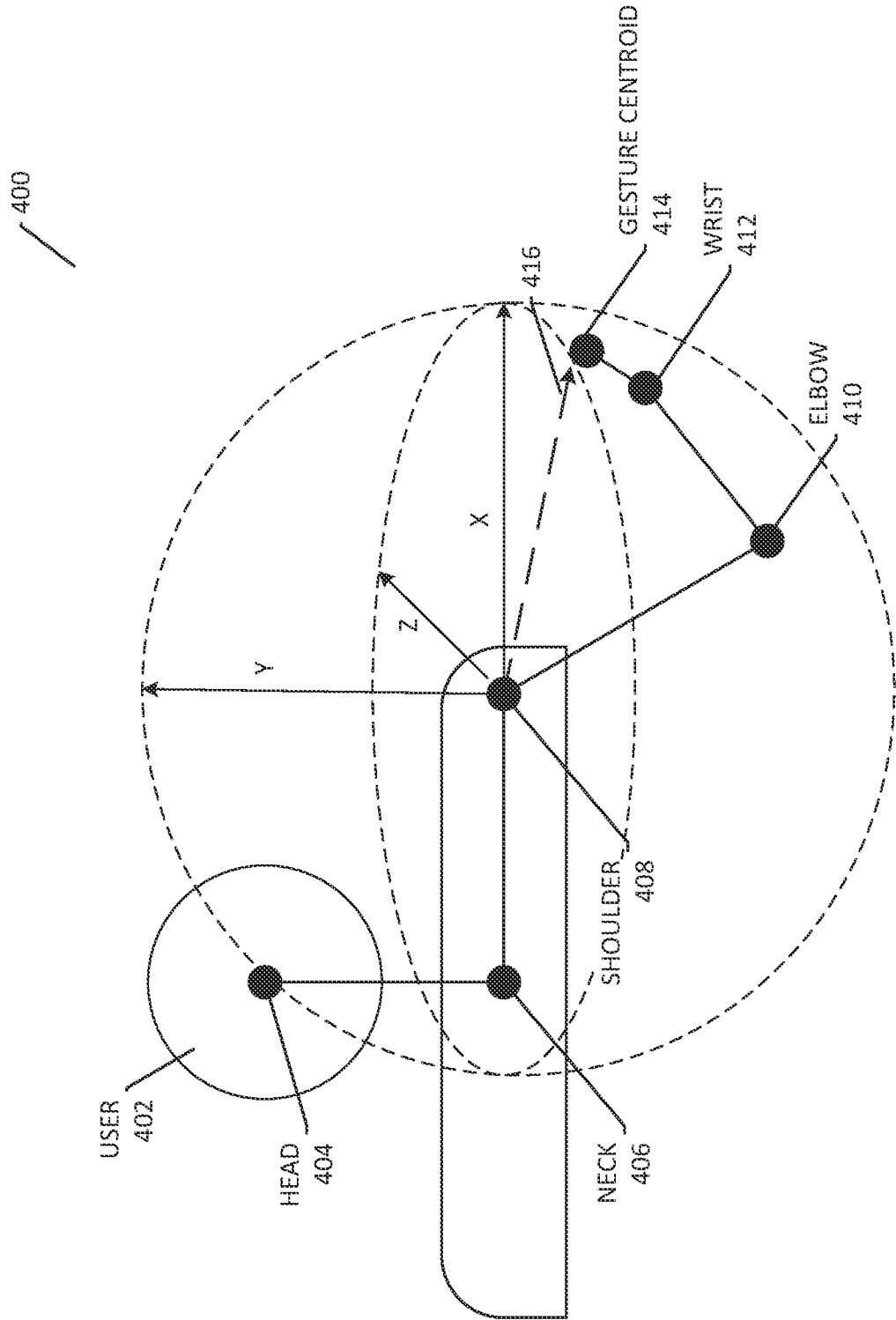
FIG. 4 shows a diagram for user-centric motion mapping, in accordance with some embodiments.

Turning to FIG. 4, a diagram is presented of various locations on a body used for motion mapping. Specifically, shoulder 408 is shown with respect to a determined neck position 406 and a determined head position 404. In some embodiments, a system providing the motion mapping may be concurrently tracking a head position 404 and/or a neck position 406, from which the shoulder position for which can be determined.

Returning to FIG. 3, the flowchart 300 continues at 315, where a distance is determined from the initial origin to the hand is determined. Alternatively, the distance may be determined based on a hand location, a gesture centroid, or the like as it relates to the reference location. In some embodiments the distance may be determined in 3D space, or 2D space. In some embodiments, the distance may be determined based on a horizontal distance between the torso location or shoulder location, and hand location. In FIG. 4, an example distance 416 is depicted. In the example diagram 400 of FIG. 4, the distance is determined between the shoulder location 408 and a gesture centroid 414.

At block 320, the initial origin location is modified based on the determined distance from block 315. In some embodiments, the origin may be modified to be located coincident with another joint. As shown in FIG. 4, the origin may optionally be located at the elbow 410 or wrist 412, depending upon a pose of the user, such as the distance between the hand and shoulder. As shown at block 325, in some embodiments, a modified origin location is determined along the gravity vector or torso-down vector from the origin location. For example, the system may be employed with a gyroscopic sensor or other component from which a gravity vector can determine. A torso-down vector can be defined a vector that points from neck to base of the spine. For example, when a person is standing or sitting straight, gravity vector and torso down vectors would align. However, when person is reclining or laying down, then torso down vector would be different from the gravity vector. The vector may indicate a ray from the shoulder or torso to the ground along which an origin location may be determined. According to some embodiments, the origin location may be modified to be any location along the path. Alternatively, the origin location may be modified based on threshold distances. As an example, when the hand is within half arm length from the shoulder column, the origin may be moved to the elbow location, or down the gravity vector from the shoulder to a point corresponding to the elbow level.

There are a variety of techniques which may be employed for modifying the origin location. For example, block 325 shows optional operations in which the modified origin location is determined along the gravity vector from the shoulder location. Thus, as a user brings the hand in toward the body, the origin location will travel along a vector beginning at the shoulder and traveling toward the ground. As such, the modified origin location may not be coincident with a location on the user, but rather may be based on the location of the user.

Similarly, block 330 indicates that the modified origin location can be determined along the vector from the shoulder location to another location. As an example, in some embodiments, the modified origin location may be determined along of vector that includes the shoulder location and an elbow location. As another example, the modified origin location may be determined along the vector that is based on the shoulder location and/or the elbow location or other location, but is not necessarily coincident with the locations of the joints on user body. In some embodiments, offsets may be added to the modified origin location. As an example, an offset may move the origin back along a vector.

The flowchart 300 continues at block 335, where an arc length is determined for the motion. The arc length is determined based on distance the user's hand travels in 3D space along a curvilinear path while the gesture is being performed. In some embodiments, the arc length may be associated with directional information that is also determined. The flowchart 300 concludes at block 340, where the input motion is mapped from the spherical coordinate system to a 2D coordinate system of a user interface plane based on the modified origin. The mapping may be performed using various techniques as described above, for example with respect to block 230.

Figure 5:
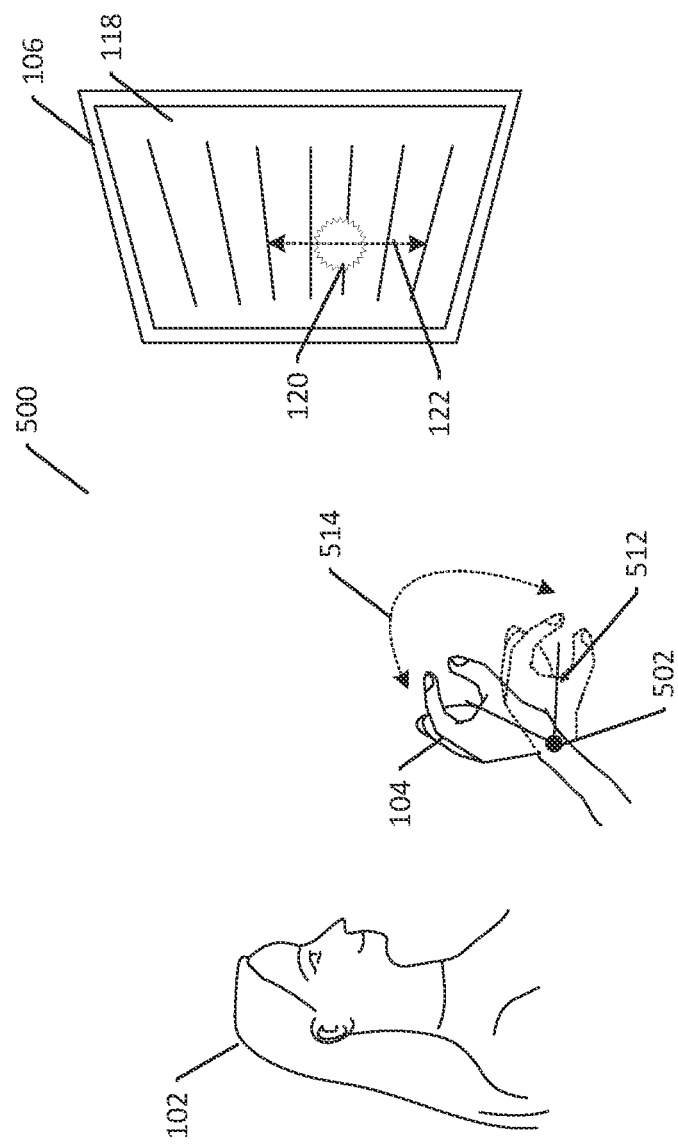
FIG. 5 shows a diagram of a user interacting with a device, in accordance with some embodiments.

In FIG. 5, an example system setup 500 is provided in which a user 102 is viewing a display device 106. In particular, FIG. 5 depicts an example of a user 102 using a gesture motion 514 by hand 104 to cause user input to modify a user input component 120 on a display device 106. As shown, the motion 514 caused by hand 104 is provided in an arc motion. In some embodiments, the motion is tracked and a spherical coordinate system. The spherical coordinate system provides an arc link of a motion 514 with respect to an origin 502. In this example system setup, the origin 502 for the spherical coordinate system is located at a wrist.

The arc length of motion 514 can be determined with respect to a radius 512 which is determined from the origin 502 to a gesture centroid 104 of the hand. According to some embodiments, the gesture centroid 104 is a point in space which is determined to be the center of an input gesture performed by a hand. As such, the gesture centroid can typically be located coincident with a point on or near the hand. The user motion in 3D space, as shown by motion 514, is mapped to a 2D user interface ("UI") plane, for example user interface 118 of display 106. For example, a user input component 120 can move in a direction 122 across the 2D plane of the user interface 118 based on the mapping of the user motion 514.

Figure 6:
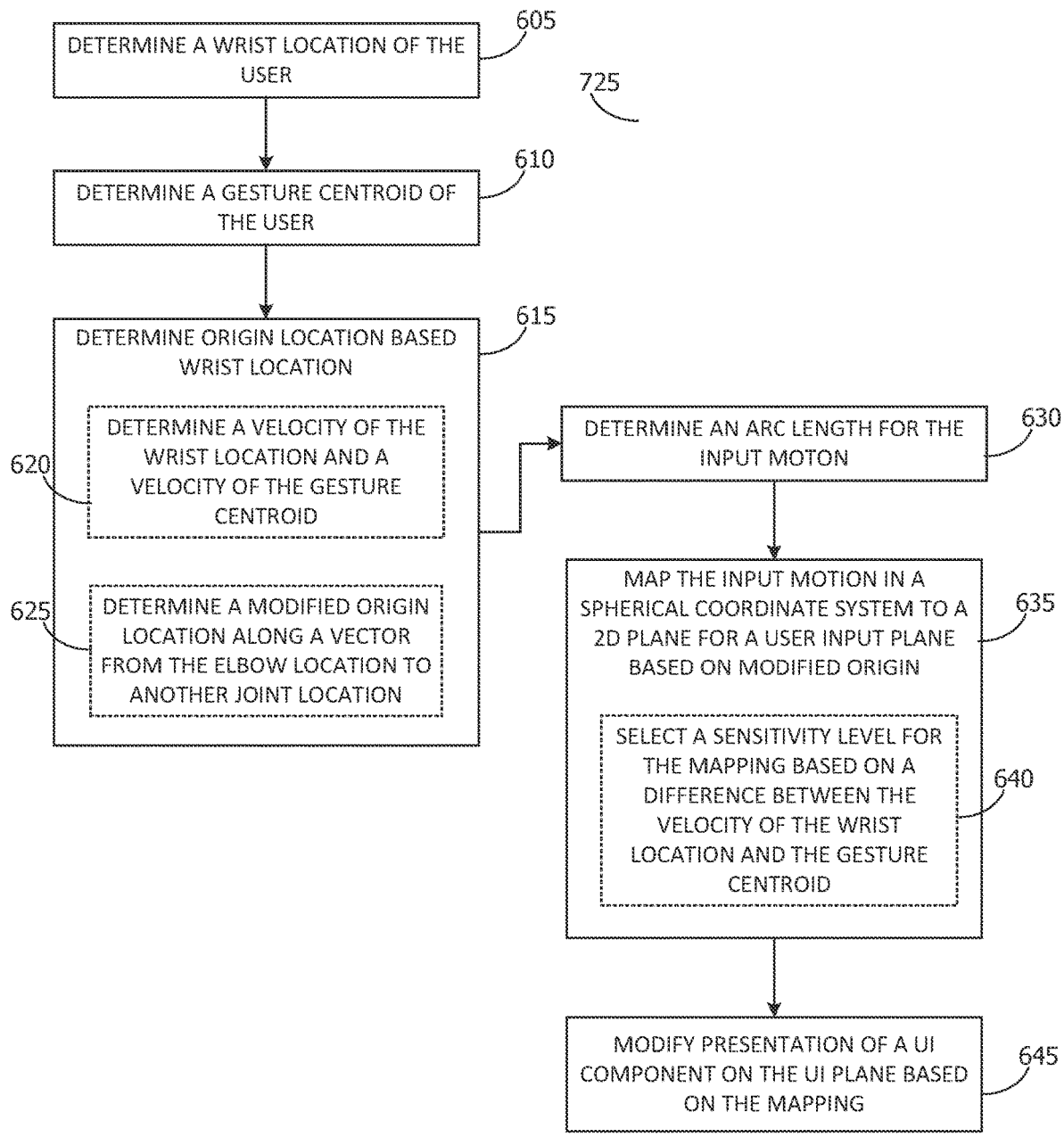
FIG. 6 shows a flow diagram of a technique for mapping a wrist motion in accordance with one or more embodiments.

FIG. 6 depicts a flowchart of a technique for mapping and input motion based on the wrist location, in accordance with one or more embodiments. For purposes of explanation, the following steps will be described in the context of FIG. 5. However, it should be understood that the various actions may be performed by alternate components. In addition, the various actions may be performed in a different order. Further, some actions may be performed simultaneously, and some may not be required, or others may be added.

The flowchart 600 begins at block 605, where a wrist location for the user is determined. The wrist location may be determined, for example, based on hand tracking techniques, or based on image data or other sensor data captured of a user's wrist. In some embodiments, the location may be determined as of point in space with respect to a user coordinate system. Similarly, at block 610, a gesture centroid is determined for the user. The gesture centroid can be a point on or around the user and that is considered a point in space at which the gesture is presented. For example, a gesture centroid for a pinch may be a point in space at which the two fingers performing the pinch make contact. As another example, the gesture centroid may be considered a central point in space for the hand, or the like.

The flowchart 600 continues at block 615, where origin is determined based on the wrist location. In some embodiments, as shown in optional block 620, the origin can be determined to be the wrist, for example, based on a motion characteristic of the wrist. As an example, in some embodiments, if a gesture centroid moves more rapidly than the associated wrist, then it may be determined that the wrist is determined to be the origin. In some embodiments, a 'movement speed ratio' may be computed, which is the ratio of pinch centroid speed and wrist speed. If this ratio exceeds a predetermined threshold, then motion is determined to be a predominantly wrist-based motion, otherwise it is determined to be an arm-based motion. The 'movement speed ratio' signal can be additionally filtered to remove spikes and noise to avoid misclassifications prior to comparing with the threshold. As such, if the movement is considered to be a wrist-based motion, the origin may be determined to be at the wrist.

Optionally, as shown at block 625, the origin location can be determined along the vector from the elbow joint to wrist location. As an example, if the motion includes arm movement as well as wrist movement, the origin may be determined to be along a vector that includes the wrist location and the elbow location, or the like to for example, the vector used may include the gesture centroid and the location or other point in space from which an appropriate vector can be determined.

The flowchart continues at block 630, where the input motion is mapped from the spherical coordinate system to a 2D plane associated with the UI. According to some embodiments, the arc length is measured along yaw and pitch, and is mapped to X and Y coordinates. The arc length is also mapped to Z coordinates with respect to radial motion. The coordinates in the spherical coordinate system are projected onto the plane of the UI. In some embodiments, a spherical projection is performed, where the position is proportional to the angle. That is, an amount of distance covered on the user interface plane is based on an angular distance the hand travels during the motion. Alternatively, in some embodiments, the distance covered on the like plane will be based on an actual distant the user's hand moves along the arc length.

Additional considerations may be determined to provide motion mapping. For example, as shown at optional block 640, a sensitivity level can be selected for the mapping. The sensitivity level can indicate the proportions with which the input motion is mapped. In some embodiments, various acceleration curves may be used for the motion. For example, an acceleration curve with a higher initial gain will produce a different visual result than an acceleration curve with a higher final gain, or a shallow acceleration curve. In some embodiments, the particular function used to perform the mapping may be driven by user preference (such as in the user profile), application settings, system settings, and the like. Further, different mapping techniques may be performed based on particular contexts, applications, and the like.

The flowchart 600 concludes at block 645, where a presentation of the UI component is modified on the UI plane based on the mapping. For example, a cursor or other input component may be caused to move along the UI plane in accordance with the mapping. Because the mapping considers distance as well as direction, a corresponding distance and direction will be apparent based on the change presentation of the UI component.

In some embodiments, the motion of the gesture centroid can be determined by using tracking information related to one or more joints of the arm. For example, hand tracking and/or body tracking systems of a client device may use sensor data to continuously track the locations of various joints of a person in relation to a particular origin. This data can be used to determine a user input motion performed by a user to drive user input.

FIG. 7 depicts an example diagram of various joint locations which can be tracked over time. This includes a shoulder 708, which may be an origin point from which user input motions are defined. When a gesture begins, the arm may be associated with the shoulder location 708, as well as an original elbow location 710, and an original wrist location 712. At a second point during the user input gesture, one or more of the joints may be moved to new locations, as shown here by final elbow location 720, final wrist location 722, and final gesture centroid 724. It should be understood that while some of the joint locations are presented as the "final" locations of the joints, it should be understood that the locations of the joints may or may not correspond to joint locations at the end of a gesture. Said another way, the "final" joint locations are used for purposes of determining a user input motion between the "original" location and the "final" location. As such, the "original" location may be an initial location of the joints prior to the gesture, an intermediate location during the gesture, or the like. Similarly, the "final" joint locations may be an intermediate location during the gesture, a terminal location at the end of the gesture, or the like. Said another way, the techniques described herein for tracking user input motion based on joint location may be practiced once or multiple times over the course of a particular gesture.

According to one or more embodiments, the result of the motion from the original joint locations to the final joint locations may be identified as a gesture centroid motion 730. The gesture centroid motion 730 may indicate motion which is translated into a user input action. Although shown as a line, it should be understood that the gesture centroid vector may be any directional motion in two or three dimensions which can be translated into a user input motion. Further, the gesture centroid motion may be determined in an arced direction or the like. In some embodiments, determining the gesture centroid motion 730 based on the original gesture centroid 714 and the final gesture centroid 724 may lead to errors. For example, because of a user's motion at each of the joints, user intent of the gesture centroid motion 730 may be lost. Further, artifacts in the hand or body tracking data may lead to errors in determining the gesture centroid motion 730 when only considering the two joint locations. As such, some embodiments described herein are directed to determining an amount of the motion attributable to each of the joints, as will be described below with respect to FIGS. 8A-8D. This may be useful, for example, when tracking data is available not just for a gesture centroid location, but for one or more additional joint locations on an arm, such as through body tracking.

Generally, some embodiments are directed to decomposing the biomechanical chain along an arm for identifying lost motion between an initial pose and a final pose. For example, a first frame or first set of body tracking data may provide pose information for an arm in a first pose, and a second frame or a second set of body tracking data may provide pose information for the arm in a second pose. The motion from that first pose to second pose attributable to each joint is determined.

Figure 8A:
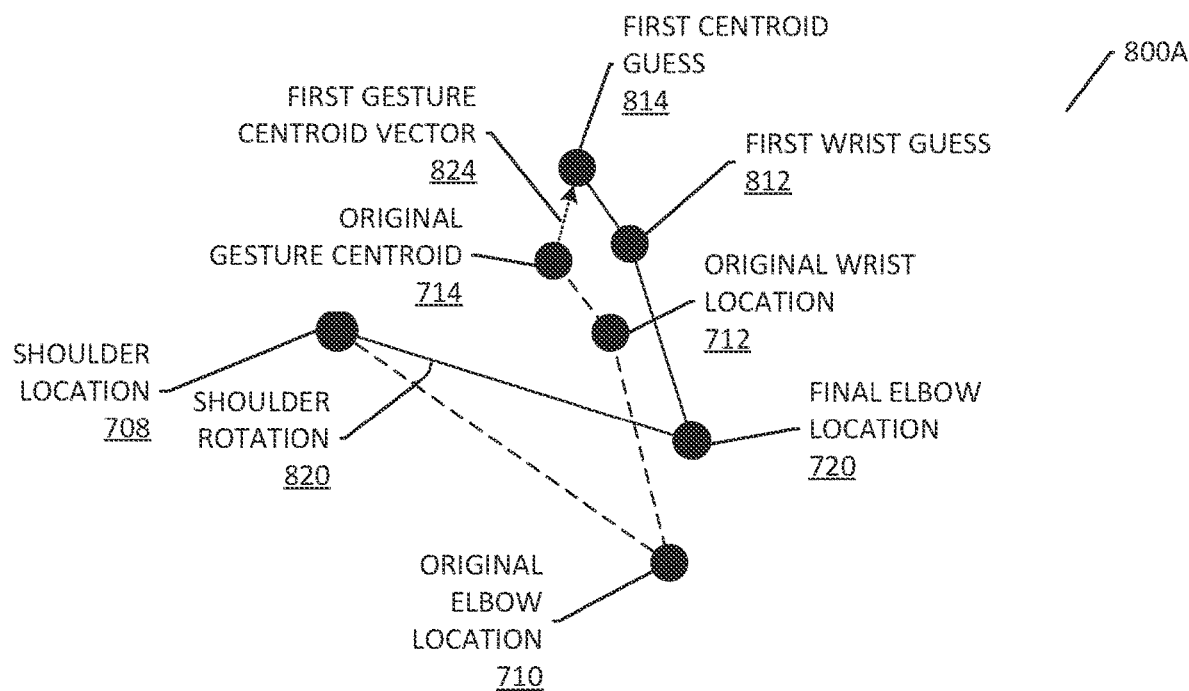
FIGS. 8A-8D show diagrams of a technique for identifying characteristics of a user input motion in accordance with one or more embodiments.

An example process for recovering lost motion data begins as shown in FIG. 8A, where characteristics of the motion attributable to a shoulder rotation are determined. The diagram 800A depicts an original pose of the arm, including shoulder location 708, original elbow location 710, original wrist location 712, and original gesture centroid location 714. Initially, characteristics of the gesture centroid motion 730 attributable to the rotation about the shoulder 708 is determined. In some embodiments, a device may use image data or other sensor data to perform body tracking techniques which can track pose information for the arm and/or individual joints of the arm. Initially, a shoulder rotation 820 is determined. The shoulder rotation 820 may be determined based on an angular distance between a first segment from the shoulder location 708 to the original elbow location 710, and a second segment from the shoulder location 708 to the final elbow location 720. In some embodiments, the shoulder may move during the input motion, for example if a user sways or rotates, however the various joint locations may be determined in a coordinate system associated with the shoulder such that the shoulder is considered stable during the motion.

Once the shoulder rotation 820 is determined, then the associated angle of the shoulder rotation can be used to infer where the other joints would end up at the end of the input motion depicted in FIG. 7 if the shoulder were to rotate but the other joints were to remain locked such that the other joints are not contributing any rotation to the motion of the arm. Said another way, a wrist location and a gesture centroid location can be estimated based on the rotation of the shoulder but not the rotation of the wrist or shoulder. These estimated locations correspond to an estimate final wrist location and final gesture centroid location if during the input motion of FIG. 7, the user performed the rotation about the shoulder but did perform rotation around other joints of the arm, such as the elbow or wrist. Thus, a first wrist guess 812 and a first centroid guess 814 are determined. The first wrist guess 812 indicates a translated location from the original wrist location 712 due to the shoulder rotation 820. Similarly, the first centroid guess 814 indicates a translated location from the original gesture centroid location due to the shoulder rotation 820.

Upon determining the first centroid guess 814, the first gesture centroid vector 824 can be determined. The first gesture centroid vector 824 may indicate characteristics of the gesture centroid motion 730 that are due to the shoulder rotation 820. For example a distance and/or direction may be represented by the first gesture centroid vector 824. According to one or more embodiments, the first gesture centroid vector 824 may be determined in the form of a unit vector. The first gesture centroid vector 824 may be represented in a coordinate space based on the first vesture centroid guess. In some embodiments, the coordinate system for the first gesture centroid vector 824 may be based on an X, Y, Z coordinate system where the Z axis originating at the original gesture centroid location 714 and oriented along a vector from the shoulder location 708 and passing through the original gesture centroid location 714.

Figure 8B:
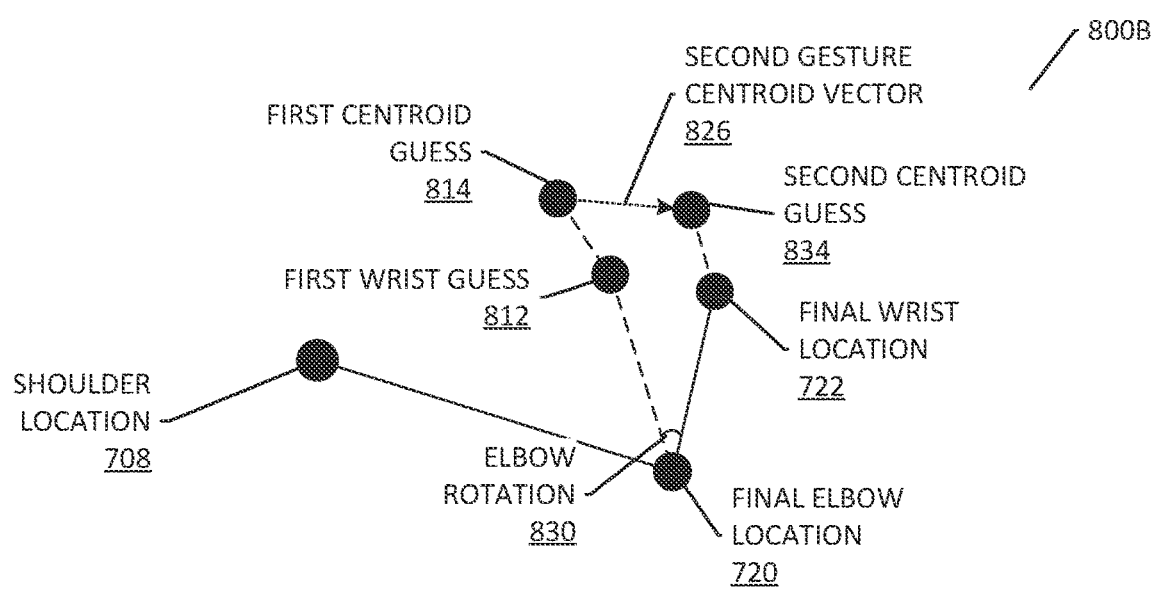

Turning to FIG. 8B, characteristics of the motion attributable to an elbow rotation are determined. The diagram 800B depicts two hybrid arm poses. A first arm pose shows the shoulder location 708, final elbow location 720, first wrist guess 812 from diagram 800A, and first centroid guess 814 from diagram 800A. The first wrist guess 812 and the first centroid guess 814 refer to estimated joint locations where the wrist and gesture centroid would have been if the input motion had included rotation about the shoulder but not the other joints. This hybrid arm pose is compared against a second hybrid arm pose consisting of the shoulder location 708, the final elbow location 720, and final wrist location 722, in order to predict a second gesture centroid guess 834. In diagram 800B, the second hybrid pose corresponds to an estimated location of the gesture centroid attributable to the elbow rotation 830, and without considering any rotation about the wrist. The elbow rotation 830 may be determined based on an angular distance between a first segment from the final elbow location 720 to the first wrist guess location 812, and a second segment from the final elbow location 720 to the final wrist location 722. According to one or more embodiments, because the elbow rotation is determined with respect to the first wrist guess location 812 rather than the original wrist location 712, the motion caused by the shoulder is effectively subtracted from the full motion of the elbow.

Upon determining the second centroid guess 834, the second gesture centroid vector 826 can be determined. The second gesture centroid vector 826 may indicate characteristics of the gesture centroid motion 730 that are attributable to the elbow rotation 830. For example, a distance and/or direction may be represented by the second gesture centroid vector 826. According to one or more embodiments, the second gesture centroid vector 826 may be determined in the form of a unit vector. The second gesture centroid vector 826 may be represented in a coordinate space based on the second gesture centroid guess 834. In some embodiments, the coordinate system for the second gesture centroid vector 826 may be based on an X, Y, Z coordinate system where the Z axis originating at the first gesture centroid guess 814 and oriented along a vector from the final elbow location 720 and passing through the first gesture centroid guess 814.

Figure 8C:
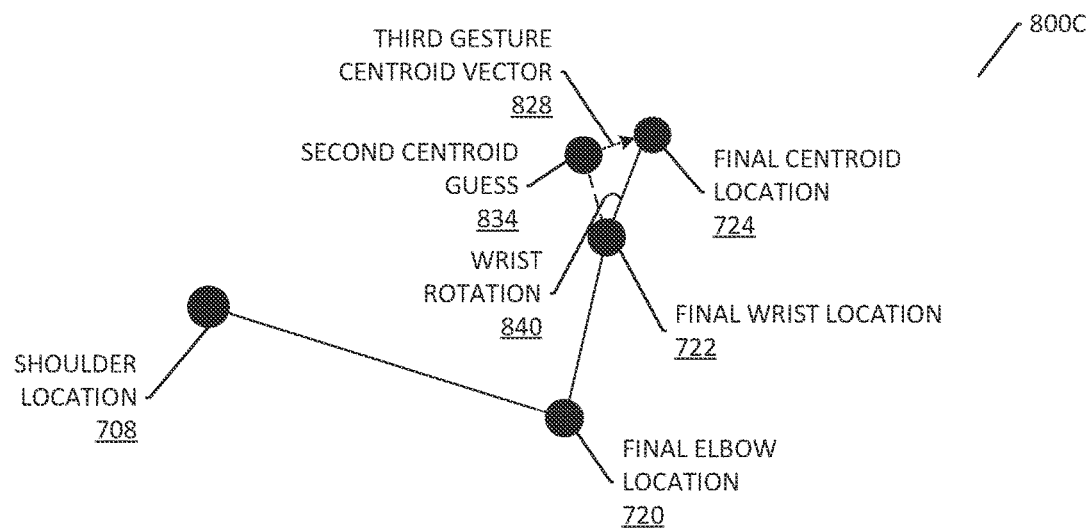

Turning to FIG. 8C, characteristics of the motion attributable to a wrist rotation are determined. The diagram 800C depicts two arm poses. A first hybrid arm pose shows the shoulder location 708, final elbow location 720, final wrist location 722, and second centroid guess 834 from diagram 800B. This arm pose is compared against a final arm pose comprised of the shoulder location 708, final elbow location 720, final wrist location 722, and final centroid location 724. The wrist rotation 840 may be determined based on an angular distance between a first segment from the final elbow location 720 to the first wrist guess location 812, and a second segment from the final elbow location 720 to the final wrist location 722.

The third gesture centroid vector 828 can be determined based on the second centroid guess 834 and the final centroid location 724. The third gesture centroid vector 828 may indicate characteristics of the gesture centroid motion 730 that are attributable to the wrist rotation 840. For example, a distance and/or direction may be represented by the third gesture centroid vector 828. According to one or more embodiments, the third gesture centroid vector 828 may be determined in the form of a unit vector. The third gesture centroid vector 828 may be represented in a coordinate space based on the third gesture centroid guess 834. In some embodiments, the coordinate system for the second gesture centroid vector 826 may be based on an X, Y, Z coordinate system where the Z axis originating at the second gesture centroid guess 834 and oriented along a vector from the final wrist location 722 and passing through the second gesture centroid guess 834.

Figure 8D:
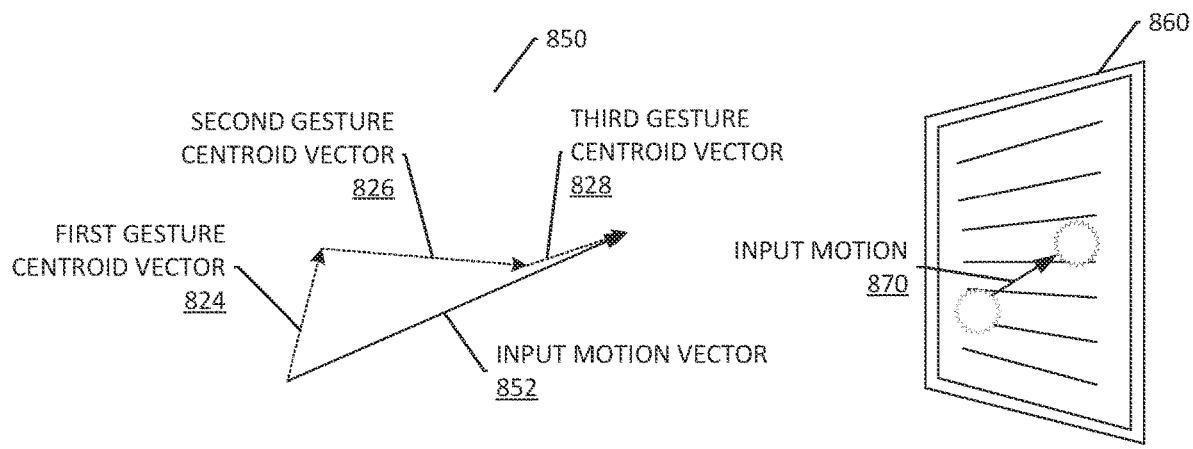

Turning to FIG. 8D, as shown in diagram 850, a final input motion vector 852 may be determined by adding the first gesture centroid vector 824 from FIG. 8A, the second gesture centroid vector 826 from FIG. 8B, and the third gesture centroid vector 828 from FIG. 8C. According to one or more embodiments, the first gesture centroid vector 824, second gesture centroid vector 826, and third gesture centroid vector 828 may be represented in the form of unit vectors. As such, the input motion vector 852 may provide a final direction of the user input motion. In some embodiments, the input motion vector 852 may be scaled to a unit vector and then multiplied against a distance between the original gesture centroid 714 and the final gesture centroid 724 to obtain a distance and direction that more accurately reflects a user's intended input motion than simply analyzing the original gesture centroid 714 and the final gesture centroid 724 without the data from other joints.

Once the input motion vector 852 is determined, the input motion vector 852 can be translated into a user input action. In the example user interface 860 shown, the input motion vector 852 is translated into an input motion 870, thereby causing movement of an item along the user input plane. According to one or more embodiments, the input motion vector may be determined in 2D or 3D. Similarly, the user input motion can be translated to 2D or 3D if needed.

Figure 9:
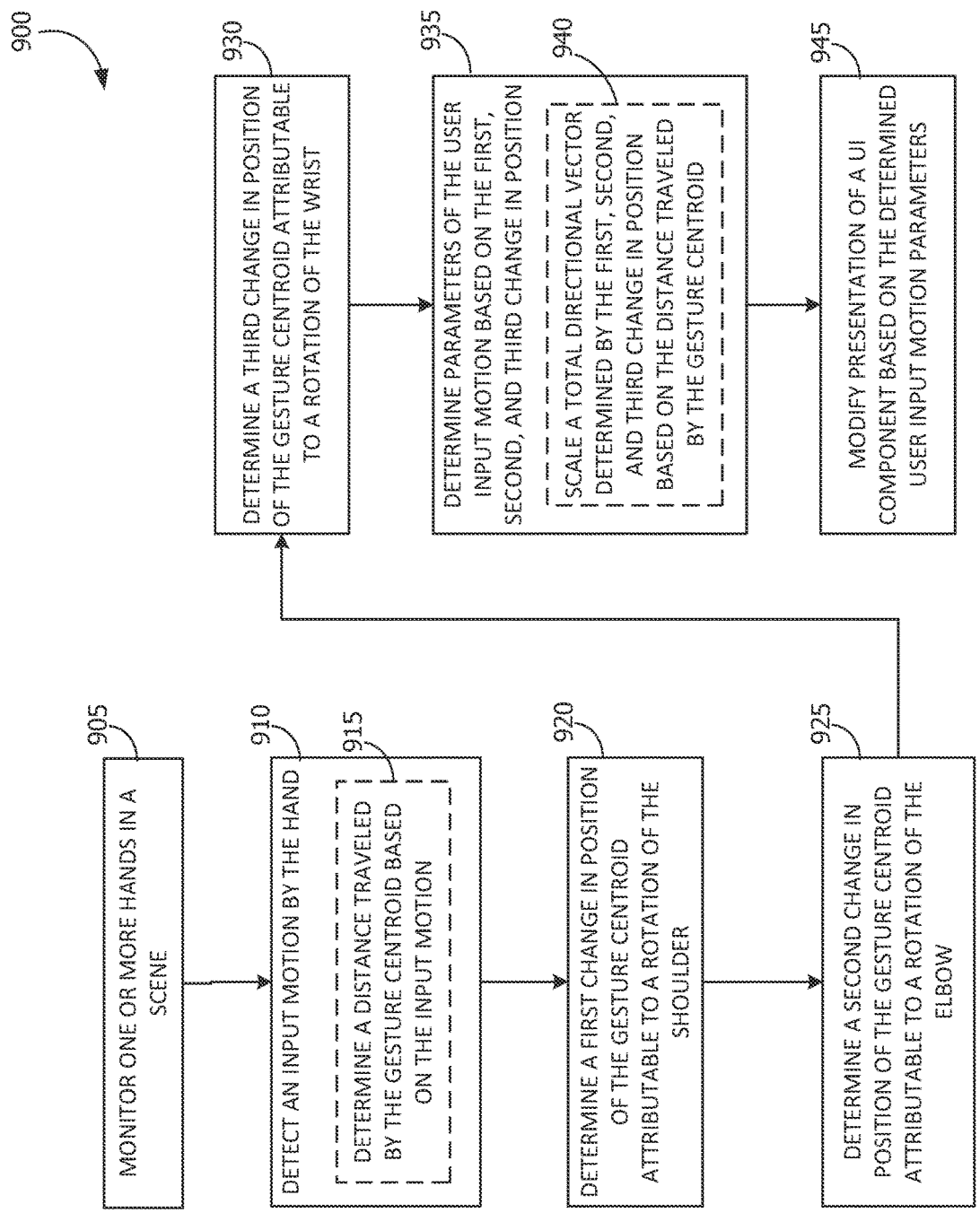
FIG. 9 shows a flowchart of a technique for determining characteristics of a user input motion in accordance with one or more embodiments.

Turning to FIG. 9, a flowchart of a technique for recovering motion is depicted in accordance with one or more embodiments. Although the various processes, it should be understood that the various actions may be performed by alternate components. In addition, the various actions may be performed in a different order. Further, some actions may be performed simultaneously, and some may not be required, or others may be added.

The flowchart 900 begins at block 905, where one or more hands are monitored in a scene. The hands can be monitored, for example, by a hand tracking system of the user device. In particular, image data and/or other sensor data may be captured of a user's hand or hands moving in space in order to determine location, motion, gestures, and the like. The one or more hands may be monitored by sensors on a wearable device worn by the user, or another device from which center data may be captured of the user's hand or hands.

The flowchart continues at block 910, where an input motion is detected by the hand or hands. For purposes of clarity, the flowchart will describe a detected input motion by a single hand, although it should be understood that in some embodiments input motion may be detected by either of the user's hands. In some embodiments, the input motion may be detected, for example, based on a predetermined gesture, pose, or other behavior by the user which is associated with triggering user input. Examples of input motions may include, for example, a pinch, a pluck, a swipe, or the like. In some embodiments, the detection of the input motion may trigger additional operations of the device in order to perform the mapping. For example, when the input motion is detected, cameras or other sensors may be powered on or otherwise initiated in order to determine user pose or other parameters or assessing the input motion. Optionally, at block 915, a distance traveled by the gesture centroid is determined based on the input motion. The gesture centroid may be determined based on a finger joint, or a location associated with hand tracking which is tracked for user input. The distance traveled may be determined, for example, by comparing a first location of the gesture centroid in a first frame of hand tracking data to a second location of the gesture centroid in a second frame of hand tracking data.

The flowchart 900 continues to block 920, where a first change in position of the gesture centroid attributable to the shoulder rotation is determined. As described above with respect to FIG. 8A, the change in position may be determined by determining a shoulder rotation from a first pose and second pose of an arm. The shoulder rotation is then translated to other joints to identify a guess as to where other joints would land based on the shoulder rotation and without consideration of the rotation of other joints.

Similarly, at block 925, a second change in position of the gesture centroid attributable to the elbow rotation is determined. As described above with respect to FIG. 8B, the change in position may be determined by determining an elbow rotation from a first pose and second pose of an arm and disregarding a portion of the rotation attributable to the shoulder rotation. The elbow rotation is then translated to other joints to identify a guess as to where other joints would land based on the shoulder rotation and without consideration of the rotation of other joints.

Further, at block 930, a third change in position of the gesture centroid attributable to the wrist rotation is determined. As described above with respect to FIG. 8C, the change in position may be determined by determining a wrist rotation from a first pose and second pose of an arm and disregarding a portion of the rotation attributable to the shoulder rotation and wrist rotation. The wrist rotation is then used to determine characteristics of the motion of the gesture centroid attributable to the wrist.

Although the above is described with respect to a shoulder, elbow, wrist, and gesture centroid, it should be understood that alternate joints of other points along an arm or associated with an input motion may be used. For example, only some of the joints may be considered, or alternative joints may be used. As such, in some embodiments, the motion of the gesture centroid (or other point associated with user input such as a finger joint or fingertip) can be determined with respect to one or more joints or other points along an arm.

The flowchart 900 continues to block 935, where parameters of the user input motion are determined based on the determined changes in position. According to some embodiments, the parameters may be determined by adding individual vectors associated with each determined change in position. Optionally, as shown in block 940, a total directional vector determined from the different changes in position can be scaled based on the distance traveled by the gesture centroid as determined at block 915.

The flowchart 900 concludes at block 940, where a presentation of the UI component is modified on the UI plane based on the mapping. For example, a cursor or other input component may be caused to move along the UI plane in accordance with the mapping. Because the mapping considers distance as well as direction, a corresponding distance and direction will be apparent based on the change presentation of the UI component. UI component may include, for example, a cursor, a scrollbar, or other movement-based input component.

Figure 10:
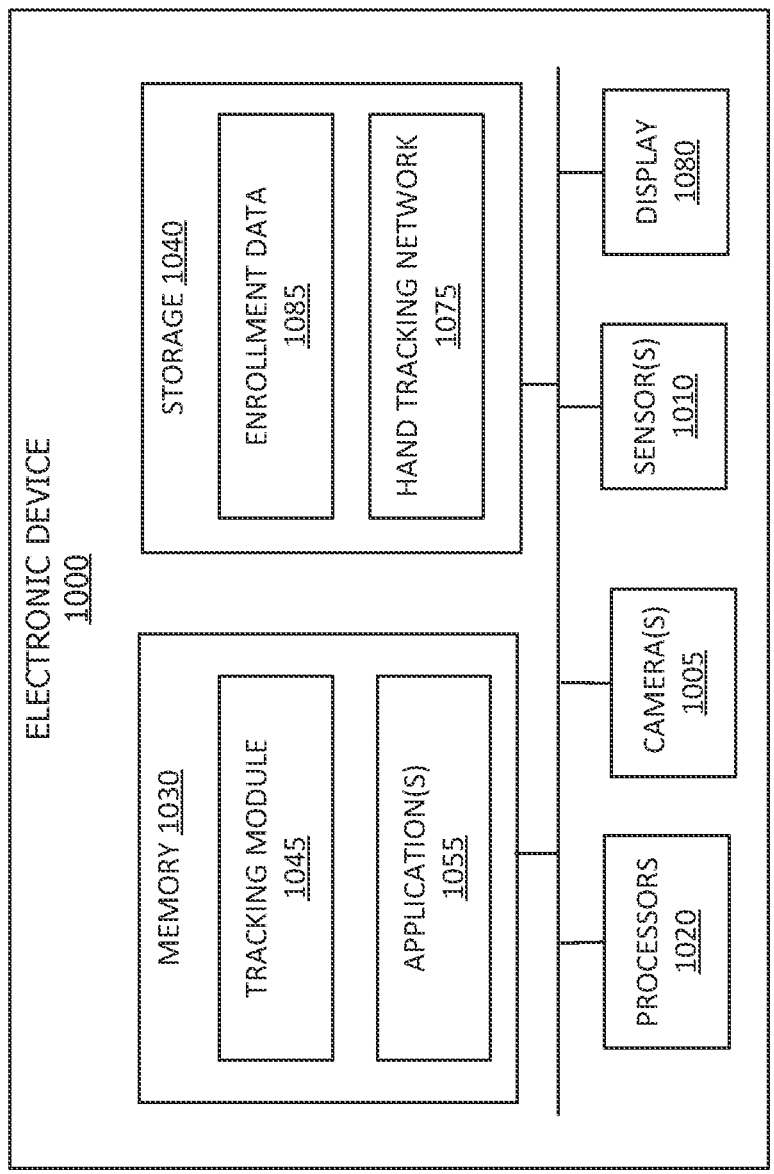
FIG. 10 shows, in block diagram form, exemplary systems for managing UI engagement, according to some embodiments.

Referring to FIG. 10, a simplified block diagram of an electronic device 1000 is depicted. Electronic device 1000 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 1000 may include one or more additional devices within which the various functionality may be contained or across which the various functionality may be distributed, such as server devices, base stations, accessory devices, and the like. Illustrative networks include, but are not limited to, a local network such as a universal serial bus (USB) network, an organization's local area network, and a wide area network such as the Internet. According to one or more embodiments, electronic device 1000 is utilized to interact with a user interface of an application 1055. It should be understood that the various components and functionality within electronic device 1000 may be differently distributed across the modules or components, or even across additional devices.

Electronic Device 1000 may include one or more processors 1020, such as a central processing unit (CPU) or graphics processing unit (GPU). Electronic device 1000 may also include a memory 1030. Memory 1030 may include one or more different types of memory, which may be used for performing device functions in conjunction with processor(s) 1020. For example, memory 1030 may include cache, ROM, RAM, or any kind of transitory or non-transitory computer-readable storage medium capable of storing computer-readable code. Memory 1030 may store various programming modules for execution by processor(s) 1020, including tracking module 1045, and other various applications 1055. Electronic device 1000 may also include storage 1040. Storage 1040 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 1030 may be utilized to store various data and structures which may be utilized for storing data related to hand tracking and UI preferences. Storage 1040 may be configured to store hand tracking network 1075 according to one or more embodiments. Electronic device may additionally include a network interface from which the electronic device 1000 can communicate across a network.

Electronic device 1000 may also include one or more cameras 1005 or other sensors 1010, such as a depth sensor, from which depth of a scene may be determined. In one or more embodiments, each of the one or more cameras 1005 may be a traditional RGB camera or a depth camera. Further, cameras 1005 may include a stereo camera or other multi-camera system. In addition, electronic device 1000 may include other sensors which may collect sensor data for tracking user movements, such as a depth camera, infrared sensors, or orientation sensors, such as one or more gyroscopes, accelerometers, and the like.

According to one or more embodiments, memory 1030 may include one or more modules that comprise computer-readable code executable by the processor(s) 1020 to perform functions. Memory 1030 may include, for example, tracking module 1045, and one or more application(s) 1055. Tracking module 1045 may be used to track locations of hands and other user motion in a physical environment. Tracking module 1045 may use sensor data, such as data from cameras 1005 and/or sensors 1010. In some embodiments, tracking module 1045 may track user movements to map movements from a spherical coordinate system to a planar coordinate system. Electronic device 1000 may also include a display 1080 which may present a UI for interaction by a user. The UI may be associated with one or more of the application(s) 1055, for example. Display 1080 may be an opaque display or may be semitransparent or transparent. Display 1080 may incorporate LEDs, OLEDs, a digital light projector, liquid crystal on silicon, or the like.

Although electronic device 1000 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 11:
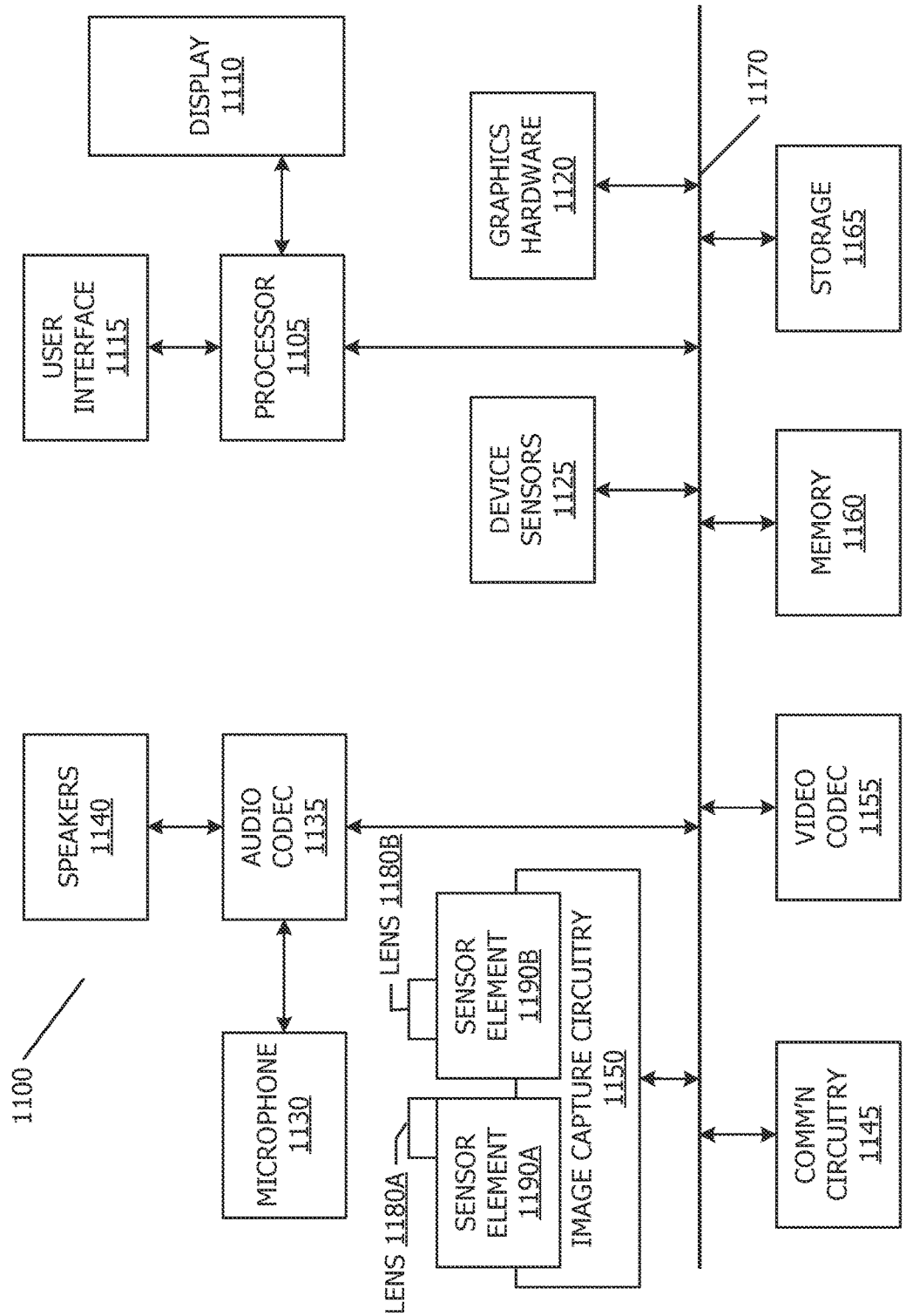
FIG. 11 shows an exemplary system for use in motion mapping, in accordance with one or more embodiments.

Referring now to FIG. 11, a simplified functional block diagram of illustrative multifunction electronic device 1100 is shown according to one embodiment. Each of electronic devices may be a multifunctional electronic device, or may have some or all of the described components of a multifunctional electronic device described herein. Multifunction electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture circuitry 1150 (e.g., including camera system), video codec(s) 1155 (e.g., in support of digital image capture unit), memory 1160, storage device 1165, and communications bus 1170. Multifunction electronic device 1100 may be, for example, a digital camera or a personal electronic device such as a personal digital assistant (PDA), personal music player, mobile telephone, or a tablet computer.

Processor 1105 may execute instructions necessary to carry out or control the operation of many functions performed by device 1100 (e.g., such as the generation and/or processing of images as disclosed herein). Processor 1105 may, for instance, drive display 1110 and receive user input from user interface 1115. User interface 1115 may allow a user to interact with device 1100. For example, user interface 1115 can take a variety of forms, such as a button, keypad, dial, a click wheel, keyboard, display screen, touch screen, gaze, and/or gestures. Processor 1105 may also, for example, be a system-on-chip such as those found in mobile devices and include a dedicated GPU. Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 to process graphics information. In one embodiment, graphics hardware 1120 may include a programmable GPU.

Image capture circuitry 1150 may include two (or more) lens assemblies 1180A and 1180B, where each lens assembly may have a separate focal length. For example, lens assembly 1180A may have a short focal length relative to the focal length of lens assembly 1180B. Each lens assembly may have a separate associated sensor element 1190. Alternatively, two or more lens assemblies may share a common sensor element. Image capture circuitry 1150 may capture still and/or video images. Output from image capture circuitry 1150 may be processed, at least in part, by video codec(s) 1155 and/or processor 1105 and/or graphics hardware 1120, and/or a dedicated image processing unit or pipeline incorporated within circuitry 1150. Images so captured may be stored in memory 1160 and/or storage 1165.

Sensor and camera circuitry 1150 may capture still and video images that may be processed in accordance with this disclosure, at least in part, by video codec(s) 1155 and/or processor 1105 and/or graphics hardware 1120, and/or a dedicated image processing unit incorporated within circuitry 1150. Images so captured may be stored in memory 1160 and/or storage 1165. Memory 1160 may include one or more different types of media used by processor 1105 and graphics hardware 1120 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 1160 and storage 1165 may be used to tangibly retain computer program instructions or code organized into one or more modules and written in any desired computer programming language. When executed by, for example, processor 1105 such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3, 6, and 9 or the arrangement of elements shown in FIGS. 1, 4-5, and 7-8, and 10-12 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for determining an input motion by a user comprising:
   in response to detecting an input motion, determining an origin location for the input motion in a user-centric spherical coordinate system with respect to a gesture centroid,
   wherein the origin location is determined along a vector originating at a shoulder of the user based on a first distance between the gesture centroid and the shoulder of the user;
   determining, based on the origin location, an arc length for the input motion;

mapping the input motion to a 2D plane of a user input component based on the arc length; and presenting a movement of a user input component on the 2D plane in accordance with the mapping.

2. The method of claim 1, wherein determining the origin location comprises:

determining a joint location for a set of joints along an arm of the user, wherein the origin location is further determined based on the joint location.

3. The method of claim 2, wherein the origin location is determined along a gravity vector originating at a shoulder location for the user.

4. The method of claim 2, further comprising:

determining a change in position of the gesture centroid attributable to each of the set of joints of the arm of the user; and mapping the input motion to the 2D plane in accordance with the change in position of the gesture centroid attributable to each of the set of joints of the arm.

5. The method of claim 1 further comprising:

determining a wrist location for a wrist of the user, wherein the origin location is determined based on the determined wrist location.

6. The method of claim 5, wherein the origin location is based on the determined wrist location and the gesture centroid.

7. The method of claim 5, further comprising:

determining a movement characteristic of the wrist and a movement characteristic of the gesture centroid, wherein the origin location is further determined based on the movement characteristic of the wrist and the movement characteristic of the gesture centroid.

8. The method of claim 7, further comprising:

mapping the input motion using a sensitivity level determined based on the movement characteristic of the gesture centroid.

9. A non-transitory computer readable medium comprising computer readable code executable by one or more processors to:

determine, in response to detection of an input motion, an origin location for the input motion in a user-centric spherical coordinate system with respect to a gesture centroid, wherein the origin location is determined along a vector originating at a shoulder of a user based on a first distance between the gesture centroid and the shoulder of the user;

determine, based on the origin location, an arc length for the input motion;

map the input motion to a 2D plane of a user input component based on the arc length; and present a movement of a user input component on the 2D plane in accordance with the mapping.

10. The non-transitory computer readable medium of claim 9, wherein the computer readable code to determine the origin location comprises computer readable code to:

determine a joint location for a set of joints along an arm of the user, wherein the origin location is further determined based on the joint location.

11. The non-transitory computer readable medium of claim 10, wherein the origin location is determined along a gravity vector originating at a shoulder location for the user.

12. The non-transitory computer readable medium of claim 10, further comprising computer readable code to:

determine a change in position of the gesture centroid attributable to each of the set of joints of the arm of the user; and map the input motion to the 2D plane in accordance with the change in position of the gesture centroid attributable to each of the set of joints of the arm.

13. The non-transitory computer readable medium of claim 9, further comprising computer readable code to:

determine a wrist location for a wrist of the user, wherein the origin location is determined based on the determined wrist location.

14. The non-transitory computer readable medium of claim 13, further comprising computer readable code to:

determine a movement characteristic of the wrist and a movement characteristic of the gesture centroid, wherein the origin location is further determined based on the movement characteristic of the wrist and the movement characteristic of the gesture centroid.

15. The non-transitory computer readable medium of claim 14, further comprising computer readable code to:

map the input motion using a sensitivity level determined based on the movement characteristic of the gesture centroid.

16. A system comprising:

one or more processors; and one or more computer readable media comprising computer readable code executable by the one or more processors to:

determine, in response to detection of an input motion, an origin location for the input motion in a user-centric spherical coordinate system with respect to a gesture centroid, wherein the origin location is determined along a vector originating at a shoulder of the user based on a first distance between the gesture centroid and the shoulder of the user;

determine, based on the origin location, an arc length for the input motion;

map the input motion to a 2D plane of a user input component based on the arc length; and present a movement of a user input component on the 2D plane in accordance with the mapping.

17. The system of claim 16, wherein the computer readable code to determine the origin location comprises computer readable code to:

determine a joint location for a set of joints along an arm of the user, wherein the origin location is further determined based on the joint location.

18. The system of claim 17, wherein the origin location is determined along a gravity vector originating at a shoulder location for the user.

19. The system of claim 16, further comprising computer readable code to:

determine a wrist location for the user, wherein the origin location is determined based on the determined wrist location.

* * * * *